United States Patent
Meng et al.

(10) Patent No.: US 10,891,620 B2
(45) Date of Patent: Jan. 12, 2021

(54) METHOD FOR RISK MANAGEMENT BASED ON AGGREGATED INFORMATION FROM MULTIPLE PAYMENT NETWORKS WHILE MAINTAINING ANONYMITY OF USER

(71) Applicant: Samsung Electronics Co., Ltd., Suwon-si (KR)

(72) Inventors: Yunsong Meng, Mountain View, CA (US); Aneesh Ali Nainamvalappil Cheriyakath, Mountain View, CA (US); Manan Kapadia, Mountian View, CA (US); Minseok Park, Mountain View, CA (US); Chung Liu, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 15/228,532

(22) Filed: Aug. 4, 2016

(65) Prior Publication Data

US 2017/0053283 A1 Feb. 23, 2017

Related U.S. Application Data

(60) Provisional application No. 62/208,306, filed on Aug. 21, 2015.

(51) Int. Cl.
*G06Q 20/40* (2012.01)
*G06Q 20/10* (2012.01)
*G06Q 20/34* (2012.01)

(52) U.S. Cl.
CPC ....... *G06Q 20/4016* (2013.01); *G06Q 20/102* (2013.01); *G06Q 20/341* (2013.01)

(58) Field of Classification Search
CPC ... G06Q 20/4016; G06F 21/31; G06F 21/335; G06F 21/62
See application file for complete search history.

(56) References Cited

U.S. PATENT DOCUMENTS 8,365,988 B1 2/2013 Medina, III et al.
8,407,139 B1 3/2013 Palmer
(Continued)

FOREIGN PATENT DOCUMENTS

EP 2879069 A2 6/2015
JP 2001-76068 A 3/2001
(Continued)

OTHER PUBLICATIONS

European Search Report dated May 17, 2019; European Appln. No. 16 839 524.2-1217.

(Continued)

*Primary Examiner* — Hao Fu

(57) ABSTRACT

A system and method is provided for accessing data across networks and from mobile devices for providing fraud detection and risk management and that maintains anonymity of users. More particularly, a system and method implemented inside a payment server is provided that can access data across networks and from mobile devices, including encoded personally identifiable information (PII) data, and aggregate and analyze such data from multiple payment networks to generate a risk score that is sent to one or more payment networks for fraud detection and risk management, while maintaining anonymity of users.

26 Claims, 6 Drawing Sheets

(56) References Cited

U.S. PATENT DOCUMENTS

| | | |
|---|---|---|
| 9,031,877 B1 | 5/2015 | Santhana et al. |
| 2007/0288359 A1 | 12/2007 | Amadio et al. |
| 2008/0022414 A1* | 1/2008 | Cahn .................. H04L 9/3236 726/28 |
| 2008/0140576 A1 | 6/2008 | Lewis et al. |
| 2010/0268557 A1* | 10/2010 | Faith .................. G06Q 20/00 705/7.29 |
| 2011/0131122 A1* | 6/2011 | Griffin ................ G06Q 40/00 705/35 |
| 2013/0102283 A1 | 4/2013 | Lau et al. |
| 2013/0311355 A1 | 11/2013 | Chirehdast |
| 2014/0070001 A1 | 3/2014 | Sanchez et al. |
| 2014/0172687 A1 | 6/2014 | Chirehdast |
| 2014/0250011 A1 | 9/2014 | Weber |
| 2015/0142446 A1 | 5/2015 | Gopinathan et al. |
| 2015/0178515 A1* | 6/2015 | Cooley .............. H04L 63/0428 713/155 |
| 2015/0235220 A1 | 8/2015 | Murphy, Jr. et al. |
| 2015/0287135 A1 | 10/2015 | Fomukong |
| 2016/0140561 A1* | 5/2016 | Cowan ............... G06Q 20/4016 705/26.35 |
| 2016/0142917 A1* | 5/2016 | Calo .................. G06Q 20/102 705/7.33 |
| 2016/0203485 A1* | 7/2016 | Subramanian ........ G06Q 30/00 705/44 |

FOREIGN PATENT DOCUMENTS

| | | |
|---|---|---|
| JP | 2014-10526 A | 1/2014 |
| WO | 2008/117171 A1 | 10/2008 |

OTHER PUBLICATIONS

Summons to attend oral proceedings pursuant to Rule 115(1) EPC dated Jul. 1, 2020 in connection with European Patent Application No. 16 839 524.2, 11 pages.

Office Action dated Oct. 13, 2020 in connection with India Patent Application No. 201817009824, 8 pages.

Decision to refuse a European Patent application dated Nov. 23, 2020 in connection with European Patent Application No. 16 839 5242, 14 pages.

* cited by examiner

METHOD FOR RISK MANAGEMENT BASED ON AGGREGATED INFORMATION FROM MULTIPLE PAYMENT NETWORKS WHILE MAINTAINING ANONYMITY OF USER

CROSS-REFERENCE TO RELATED APPLICATION(S)

This application claims the benefit under 35 U.S.C. § 119(e) of a U.S. Provisional application filed on Aug. 21, 2015 in the U.S. Patent and Trademark Office and assigned Ser. No. 62/208,306, the entire disclosure of which is hereby incorporated by reference.

TECHNICAL FIELD

The present disclosure relates to a system and method that can access data across networks and from mobile devices for providing fraud detection and risk management and that maintains anonymity of users. More particularly, the present disclosure relates to a system and method implemented inside a payment server that can access data across networks and from mobile devices, including encoded personally identifiable information (PII) data, and aggregate and analyze such data from multiple payment networks for fraud detection and risk management, while maintaining anonymity of users.

BACKGROUND

Mobile terminals have been developed and widely implemented to provide wireless communication between users. As technology has advanced, mobile terminals now provide many additional features beyond simple telephone conversation. For example, mobile terminals are now able to provide additional functions such as an alarm, short messaging service (SMS), multimedia messaging service (MMS), e-mail, games, remote control of short range communications, image capturing using mounted digital cameras, multimedia functions for providing audio and video content, scheduling functions, and many more. With the plurality of features now provided, a mobile terminal has effectively become a necessity of daily life.

One such additional function is a payment application such as Samsung Pay™, Android Pay™, Apple Pay™, and the like. These functions allow a user to make a purchase at a point of sale terminal or elsewhere using an electronic device. However, as recently determined, less than 0.5% of all phones capable of making mobile payments were used to do so at least once a month. Such usage is predicted to increase.

Usage and mobile payments are increasing as convenience and security issues are resolved. However, acceptance problems for smartphone payments continue to exist. One concern is how to protect user privacy. Another concern is the existing disconnect between user information across payment networks (e.g., VISA, AMEX, MASTERCARD, and so forth). Traditional fraud detection and risk management methods are of little use due to missing transaction detail data.

Accordingly, there is a need for a system and method that can access data across networks and from mobile devices for providing fraud detection and risk management and that maintains anonymity of users.

SUMMARY

Aspects of the present disclosure are provided to address at least the above-mentioned problems and/or disadvantages and to provide at least the advantages described below.

Accordingly, an aspect of the present disclosure is to provide a system and method that can access data across networks and from mobile devices for providing fraud detection and risk management and that maintains anonymity of users. Such a system and method can be implemented inside a payment server that can access data across networks and from mobile devices, including encoded PII data, and aggregate and analyze such data from multiple payment networks for fraud detection and risk management, while maintaining anonymity of users. In doing so, the system and method is rooted in computer technology to overcome a problem specifically arising in the realm of computer networks.

In accordance with an aspect of the present disclosure, a method for transaction risk reduction is provided. The method includes operations for receiving a request from a device, the request including payment card data and device data, generating aggregated data by retrieving stored information from one or more knowledge bases, each knowledge base being associated with a payment network supporting a particular type of payment card, computing a risk score based on the request and the aggregated data, and sending the risk score to a payment network corresponding to the request, for risk determination.

In accordance with an aspect of the present disclosure, a method for preventing enrollment fraud and reducing enrollment risk is provided. The method includes operations for receiving a payment card enrollment request from a mobile device, extracting enrollment data of a payment card and device data of the mobile device from the payment card enrollment request, retrieving, from one or more knowledge bases, with each knowledge base corresponding to a payment network supporting a type of payment card, a plurality of records including user common information, user account information, user activity information, and device information, generating aggregated data based on the user common information, user account information, user activity information and the device information, computing a risk score based on the enrollment data, the device data and the aggregated data, and sending the risk score to a payment network corresponding to the payment card enrollment request, for risk potential determination.

In accordance with an aspect of the present disclosure, a method for preventing transaction fraud and reducing transaction risk is provided. The method includes operations for receiving a payment card transaction request from a mobile device, extracting transaction data of a payment card and device data of the mobile device from the payment card transaction request, retrieving, from one or more knowledge bases, with each knowledge base corresponding to a payment network supporting a type of payment card, a plurality of records including user common information, user account information, user activity information, and device information, generating aggregated data based on the user common information, user account information, user activity information and the device information, computing a risk score based on the transaction data, the device data and the aggregated data, and sending the risk score to a payment network corresponding to the payment card transaction request, for risk potential determination.

In accordance with an aspect of the present disclosure, an electronic device for transaction risk reduction is provided. The electronic device includes a memory configured to store data and executable instructions, a transceiver for transmitting and receiving the data, and a processor configured by the executable instructions to receive a request from a device, the request including payment card data and device data, generate aggregated data by retrieving stored information from one or more knowledge bases, each knowledge base being associated with a payment network supporting a particular type of payment card, compute a risk score based on the request and the aggregated data, and send the risk score to a payment network corresponding to the request, for risk determination.

In accordance with an aspect of the present disclosure, a non-transitory computer readable storage medium with a computer program stored thereon is provided. The computer program, when executed by a processor, performs a method for transaction risk reduction, that includes operations for receiving a request from a device, the request including payment card data and device data, generating aggregated data by retrieving stored information from one or more knowledge bases, each knowledge base being associated with a payment network supporting a particular type of payment card, computing a risk score based on the request and the aggregated data, and sending the risk score to a payment network corresponding to the request, for risk determination.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will become more apparent from the following description, taken in conjunction with the accompanying drawings, in which.

Throughout the drawings, it should be noted that like reference numbers are used to depict the same or similar elements, features, and structures.

DETAILED DESCRIPTION

Figure 1:
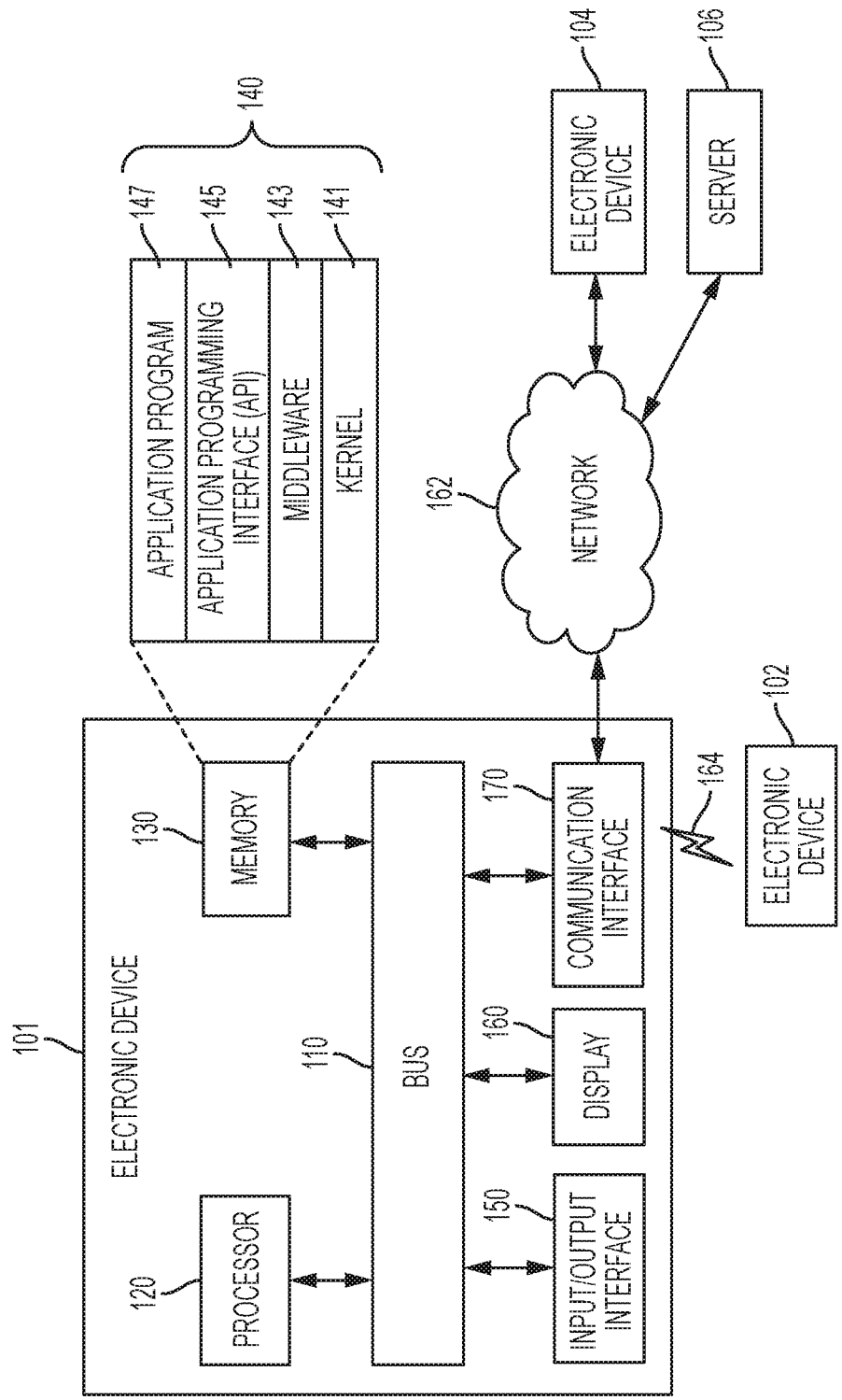
FIG. 1 is a block diagram illustrating an electronic device in a payment system according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the spirit and scope of the disclosure. In addition, descriptions of well-known functions and constructions are omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the present disclosure are provided for illustration purpose only, and not for the purpose of limiting the disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication and processing functionality. For example, such an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication and processing functionality. A smart home appliance may be, for example, a television, a digital video disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may also be a form of furniture, part of a building/structure, an electronic board, an electronic signature receiving device, a projector, various measuring devices (e.g., water, electricity, gas or electro-magnetic wave measuring devices), and/or the like, that include communication and processing functionality.

According to various embodiments of the present disclosure, an electronic device may also be any combination of the foregoing devices. In addition, it will be apparent to one having ordinary skill in the art that an electronic device according to various embodiments of the present disclosure is not limited to the foregoing devices.

Embodiments of the present disclosure include a system and method implemented with a payment server in a payment environment for fraud detection and risk management by aggregating, evaluating, and sharing user account information from multiple payment networks while maintaining anonymity of users. In doing so, the system and method is rooted in computer technology to overcome a problem specifically arising in the realm of computer networks. Due to the unique position of a payment server in the complete mobile pay ecosystem, the system and method is able to access user information across all payment networks (e.g., VISA, AMEX, MASTERCARD, and so forth) that are only available under the mobile payment framework. Contracts with each payment network may be used to limit certain access to detailed transaction information. However, according to various embodiments of the present disclosure, a system and method that is implemented inside a payment server can generally access data across networks and from mobile devices, including hashed PII data, and aggregate and analyze such data from multiple payment networks to generate a risk score that is sent to one or more payment networks for fraud detection and risk management, while maintaining anonymity of users.

For example, by taking advantage of the unique position of the payment server in the complete mobile pay ecosystem, a system and method is provided that is able to compute risk values based on information aggregated across multiple payment networks. In doing so, where an attacker performs malicious activities in a user's account, such as a VISA account, then tries to attack the user's other accounts, such as an AMEX account, the activities in the AMEX account will be declined for example, at the time of provisioning an AMEX card. In this case, the attacker would not be able to enroll any credit card. In a process of token provisioning according to an embodiment of the present disclosure, a user enrolls their credit cards with a digital payment service provider by providing their primary account number (PAN), security code, and other account information. The digital payment service provider requests a payment token from a payment network (like VISA) for the enrolled account. With the approval, the payment network replaces the consumer's PAN with the token and shares the token with the digital payment service provider for online and mobile payment use. A payment token can be limited to a specific mobile device, e-Commerce merchant, or number of purchase transactions before expiring. As noted above, where an attacker performs malicious activities in one of a user's accounts then tries to attack another of the user's accounts, the activity will be declined at the at the time of provision.

Further, where an attacker performs malicious activities on all networks but is not detected, as in the case where such activities are not serious enough to alarm any individual network, a risk score will be raised nevertheless because the system and method determines the risk based on information aggregated across networks. In the case where an attacker manipulates devices (e.g., root devices, factory resets, and the like), initial provision attempts will be declined because the system and method detects the abnormal device behaviors.

The system and method can be implemented for risk reduction when receiving a request from a device, the request including payment card data (e.g., credit card data) and device data (e.g., smartphone data). The following description is directed to a credit card request, but embodiments are not limited thereto.

In response to the request, the system and method generates aggregated data by retrieving stored information from one or more knowledge bases, each knowledge base being associated with a payment network supporting a particular type of credit card, and computes a risk score based on the request and the aggregated data. The system and method then sends the risk score to a payment network corresponding to the request for risk determination. The system and method can be implemented to perform such a risk assessment based on the aggregated information. In these or other embodiments, examples include real-time risk assessment that is applicable to various transactions, credit card enrollment and/or credit card purchase, but embodiments are not limited thereto.

The system and method can be implemented using knowledge bases, each knowledge base being associated with a payment network supporting a particular type of credit card. In these or other embodiments, examples of stored data include user common information (e.g., location, name, zip code, phone number, and so forth), user account information (e.g., number of active cards, age of account, and so forth), user activity information (e.g., day since last activity, number of transactions, number of enrollment attempts, and so forth), and device information (e.g., number of registered devices for the user, age of account on device, country of account on device (i.e., country associated with the device), and so forth).

To provide user anonymity, the system and method can be implemented using private information protection. For example, the system and method can be implemented to protect private user data (e.g., encoding of credit card numbers and expiration dates, hashing user information, and so forth) that prevent attack, even when the payment server is compromised. However, the system and method remains able to identify and aggregate user data, and calculate risk scores based thereon, using for example, encoded and hashed information. According to an embodiment of the present disclosure, PII can be protected by hashing, but embodiments are not limited thereto. For example, each user device can have a different salt, and the salt for each device can be unknown by the payment server. A salt is random data that is used as an additional input to a one-way function that hashes a password or passphrase. Each user device can be provided with a unique and different salt during enrollment of payment cards, at installation of client applications on the device, or at any other time as required. Without the salt, the payment server is unable to compute the PII data based on the hash.

The system and method can then identify and aggregate PII hash data based on, for example, the number of unique hashed values, with activity information, device account information, user information and/or other information from payment network knowledge bases for the particular PII. Additional data of various knowledge bases can be included in the aggregated data, and a risk score can be based on the aggregated data.

FIG. 1 is a block diagram illustrating an electronic device in a payment system according to an embodiment of the present disclosure.

Referring to FIG. 1, an electronic device 101 may include a bus 110, a processor 120, a memory 130, an input/output interface 150, a display 160, and a communication interface 170. In some embodiments of the present disclosure, the electronic device 101 may exclude components or may add additional components or combine and arrange components in various manners.

The bus 110 may include a circuit for connecting the components and transferring communications (e.g., control messages and/or data) between the components. The processor 120 may include one or more of a CPU, an AP, and a communication processor (CP). The processor 120 may perform controls for the components of the electronic device 101, and/or perform operations or data processing relating to communications. The memory 130 may include a volatile and/or non-volatile memory. For example, the memory 130 may store commands or data related to components of the electronic device 101. According to an embodiment of the present disclosure, the memory 130 may store software and/or a program 140. The program 140 may include, e.g., a kernel 141, middleware 143, an application programming interface (API) 145, and/or an application program 147 (or "application"). At least a portion of the kernel 141, middleware 143, or API 145 may be denoted an operating system (OS).

For example, the kernel 141 may control or manage system resources (e.g., the bus 110, processor 120, or memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application 147 in order of priority. For example, the middleware 143 may assign at least one application 147 with priority for using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application 147.

The API 145 may be an interface allowing the application 147 to control functions provided from the kernel 141 or the middleware 143. For example, the API 145 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, a microelectromechanical systems (MEMS) display, or an electronic paper display. The display 160 may display, e.g., various contents (e.g., one or more of text, images, videos, icons, and symbols) to the user. Where the display 160 includes a touchscreen, the display 160 may also receive, e.g., a touch, gesture, proximity or hovering input using an electronic pen or a body portion of the user.

The communication interface 170 may set up communications between the electronic device 101 and an external electronic device (e.g., a first external electronic device 102, a second external electronic device 104, or a server 106). For example, the communication interface 170 may be connected with a network 162 through a wired or wireless communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth (BT), near-field communication (NFC), or GNSS. The GNSS may include at least one of, e.g., a global positioning system (GPS), global orbiting navigation satellite system (GLONASS), Beidou navigation satellite system (hereinafter, "Beidou") and Galileo, or the European global satellite-based navigation system. Hereinafter, the terms "GPS" and "GNSS" may be used interchangeably. The wired connection may include at least one of a universal serial bus (USB), high definition multimedia interface (HDMI), recommended standard 232 (RS-232), or plain old telephone service (POTS). The network 162 may include at least one of a telecommunication network, e.g., a computer network (e.g., local area network (LAN) or wide area network (WAN)), Internet, or a telephone network.

The first and second external electronic devices 102 and 104 each may be a device of the same or different type as the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the external electronic devices 102 and 104 or server 106). According to an embodiment of the present disclosure, when the electronic device 101 is to perform some function or service automatically or upon request, the electronic device 101, instead of executing the function or service on its own or additionally, may request another device (e.g., external electronic devices 102 and 104 or server 106) to perform at least some functions associated therewith. The other electronic device (e.g., external electronic devices 102 and 104 or server 106) may execute the requested functions or additional functions, and transfer a result of the execution to the electronic device 101. The electronic device 101 may provide a requested function or service as it is, or after further processing of the received result. To that end, cloud computing, distributed computing, or client-server computing techniques for example, may also be used.

According to an embodiment of the present disclosure, the processor 120 may include an AP as a main processor, which is a high-power processor that includes a high-performance CPU and a high-capability memory for performing user interfaces (UIs) and complicated computations, and a supplementary processor (SP), which may be a low-power processor having a low-performance CPU and a low-capability memory as compared with the AP. According to an embodiment of the present disclosure, a first processor may include the SP, a sub-processor or a low-power processor, and a second processor may include the AP, a main processor or a high-power processor. The AP may process at least part of information obtained from other elements (e.g., at least one of the SP, the memory 130, the input/output interface 150, or the communication interface 170) and may use the same in various manners. For example, the AP may control at least some functions of the electronic device 101 so that the electronic device 101 may interwork with another electronic device (e.g., the external electronic device 102 or 104 or the server 106). The AP may be integrated with the processor 120 or the communication interface 170. According to an embodiment of the present disclosure, at least one configuration of the AP may be included in the server 106 and may be supported for at least one operation implemented on the AP from the server 106. Here, the AP may have the same configuration as the processor 120, and the AP may be denoted as a "main processor," "central processing apparatus," "CPU," "high-power processor," "high-specification processor," or "AP."

The SP may be included in the processor 120 and may be a processor provided separately from the AP and optimized for low-power operations, and the SP may have a lower computational capability and further restricted interfaces and memories as compared with the AP to enable continuous operation with relatively minimized power consumption. The SP may interwork with, e.g., at least one sensor (e.g., an acceleration sensor, gyro-sensor, or geo-magnetic sensor) to collect sensing data and may use the collected sensing data to produce context data representing the user's motion state (e.g., sitting, standing, walking, running, biking, or driving), a moving speed or a moving direction. Further, the SP may interwork with at least one communication module (e.g., a Wi-Fi module, a BT module, a GNSS module, or an NFC module) to obtain location information or discover short-range wireless signals. Here, the SP may also be denoted as a "sub processor," "sensor hub," "communication module," "GPS module," "micro controller," "sensing processor," or "SP."

Figure 2:
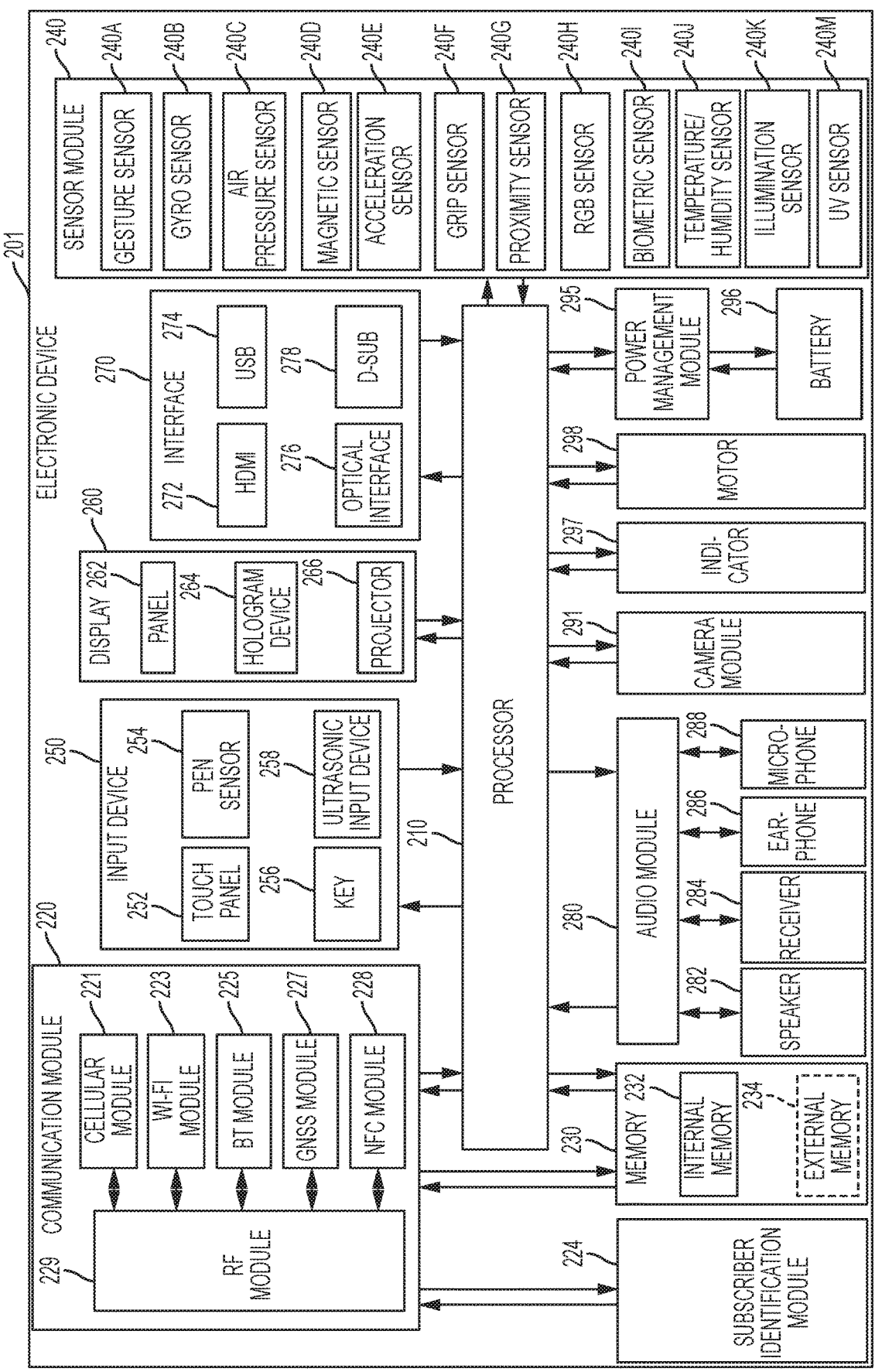
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the entire configuration of, e.g., the electronic device 101 shown in FIG. 1, or only parts thereof. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application program, and the processor 210 may process and compute various data. The processor 210 may be implemented in, e.g., a system on chip (SoC). According to an embodiment of the present disclosure, the processor 210 may further include a graphic processing unit (GPU) and/or an image signal processor (ISP). The processor 210 may also include at least some (e.g., cellular module 221) of the additional components shown in FIG. 2. The processor 210 may load a command or data received from at least one of other components (e.g., a non-volatile memory) on a volatile memory, process the command or data, and store various results and other data in the non-volatile memory.

The communication module 220 may have the same or similar configuration as the communication interface 170 of FIG. 1. The communication module 220 may include, e.g., a cellular module 221, a Wi-Fi module 223, a BT module 225, a GNSS module 227, an NFC module 228, and a radio frequency (RF) module 229. The cellular module 221 may provide voice call, video call, text, or Internet services through, e.g., a communication network. The cellular module 221 may also perform identification or authentication on the electronic device 201 in the communication network using a SIM 224 (e.g., the SIM card). According to an embodiment of the present disclosure, the cellular module 221 may perform at least some of the functions provided by the processor 210. According to an embodiment of the present disclosure, the cellular module 221 may also include a CP.

The Wi-Fi module 223, the BT module 225, the GNSS module 227, or the NFC module 228 may include a processor for, e.g., processing data communicated through the module. At least some (e.g., two or more) of the cellular module 221, the Wi-Fi module 223, the BT module 225, the GNSS module 227, and the NFC module 228 may be included in a single integrated circuit (IC) or an IC package. The RF module 229 may communicate and receive data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GNSS module 227, and the NFC module 228 may communicate and receive RF signals through a separate RF module.

The SIM 224 may include, e.g., a card including a SIM and/or an embedded SIM, and may contain unique identification information (e.g., an integrated circuit card identifier (ICCID) or subscriber information (e.g., an international mobile subscriber identity (IMSI)). The memory 230 (e.g., the memory 130) may include, e.g., an internal memory 232 and/or an external memory 234. The internal memory 232 may include at least one of, e.g., a volatile memory (e.g., a dynamic random access memory (DRAM), a static RAM (SRAM), a synchronous DRAM (SDRAM), and the like) and a non-volatile memory (e.g., a one-time programmable read-only memory (OTPROM), a PROM, an erasable and programmable ROM (EPROM), an electrically EPROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a mini-SD memory, an extreme digital (xD) memory, or a memory stick. The external memory 234 may also be functionally and/or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, and an ultra violet (UV) sensor 240M. Additionally or alternatively, the sensing module 240 may include one of, e.g., an E-nose sensor, an electromyography (EMG) sensor, an electroencephalogram (EEG) sensor, an electrocardiogram (ECG) sensor, an infrared (IR) sensor, an iris sensor, and a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of an AP 210 or separately from the AP 210, and the electronic device 201 may control the sensor module 240 while the AP is in a sleep mode.

The input device 250 may include at least one of, e.g., a touch panel 252, a (digital) pen sensor 254, a key 256, and an ultrasonic input device 258. The touch panel 252 may use at least one of capacitive, resistive, infrared, and ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include one of, e.g., a physical button, an optical key, and a key pad. The ultrasonic input device 258 may use an input tool that generates an ultrasonic signal and enables the electronic device 201 to identify data by sensing the ultrasonic signal to a microphone (e.g., microphone 288).

The display 260 (e.g., the display 160) may include one of a panel 262, a hologram device 264, and a projector 266. The panel 262 may have the same or similar configuration as the display 160 of FIG. 1. The panel 262 may be configured to be at least one of flexible, transparent, impact-resistant and/or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment of the present disclosure, the display 260 may further include a control circuit to control the panel 262, the hologram device 264, or the projector 266.

The interface 270 may include e.g., an HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition Link (MHL) interface, an SD card/multimedia card (MMC) interface, or an infrared data association (IrDA) standard interface. The audio module 280 may convert sound into an electric signal or vice versa, for example. At least a part of the audio module 280 may be included in e.g., the input/output interface 150 as shown in FIG. 1. The audio module 280 may process sound information input or output through one of, e.g., a speaker 282, a receiver 284, an earphone 286, and a microphone 288. The camera module 291 may be a device for capturing still images and videos, and may include, according to an embodiment of the present disclosure, at least one of one or more image sensors (e.g., front and back sensors), a lens, an ISP, and a flash such as a LED or xenon lamp.

The power manager module 295 may manage power of the electronic device 201, for example. Although not shown, according to an embodiment of the present disclosure, the power manager module 295 may include one of a power management integrated circuit (PMIC), a charger IC, a battery gauge, and a fuel gauge. The PMIC may have a wired and/or wireless recharging scheme. The wireless charging scheme may include e.g., one of a magnetic resonance scheme, a magnetic induction scheme, an acoustic scheme, and an electromagnetic wave based scheme, and an additional circuit, such as a coil loop, a resonance circuit, a rectifier, and the like may be added for wireless charging. The battery gauge may measure an amount of remaining power of at least one of the battery 296, a voltage, a current, and a temperature while the battery 296 is being charged. The battery 296 may include one of, e.g., a rechargeable battery and a solar battery.

The indicator 297 may indicate a particular state of the electronic device 201 or a part (e.g., the processor 210) of the electronic device, including at least one of, e.g., a booting state, a message state, and a recharging state. The motor 298 may convert an electric signal into a mechanical vibration, and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with the type of electronic device. The electronic device in accordance with various embodiments of the present disclosure may include at least one of the aforementioned components, omit some of the components, or include additional component(s). Some of the components may be combined into an entity, where the entity may perform the same functions as the separate components.

Figure 3:
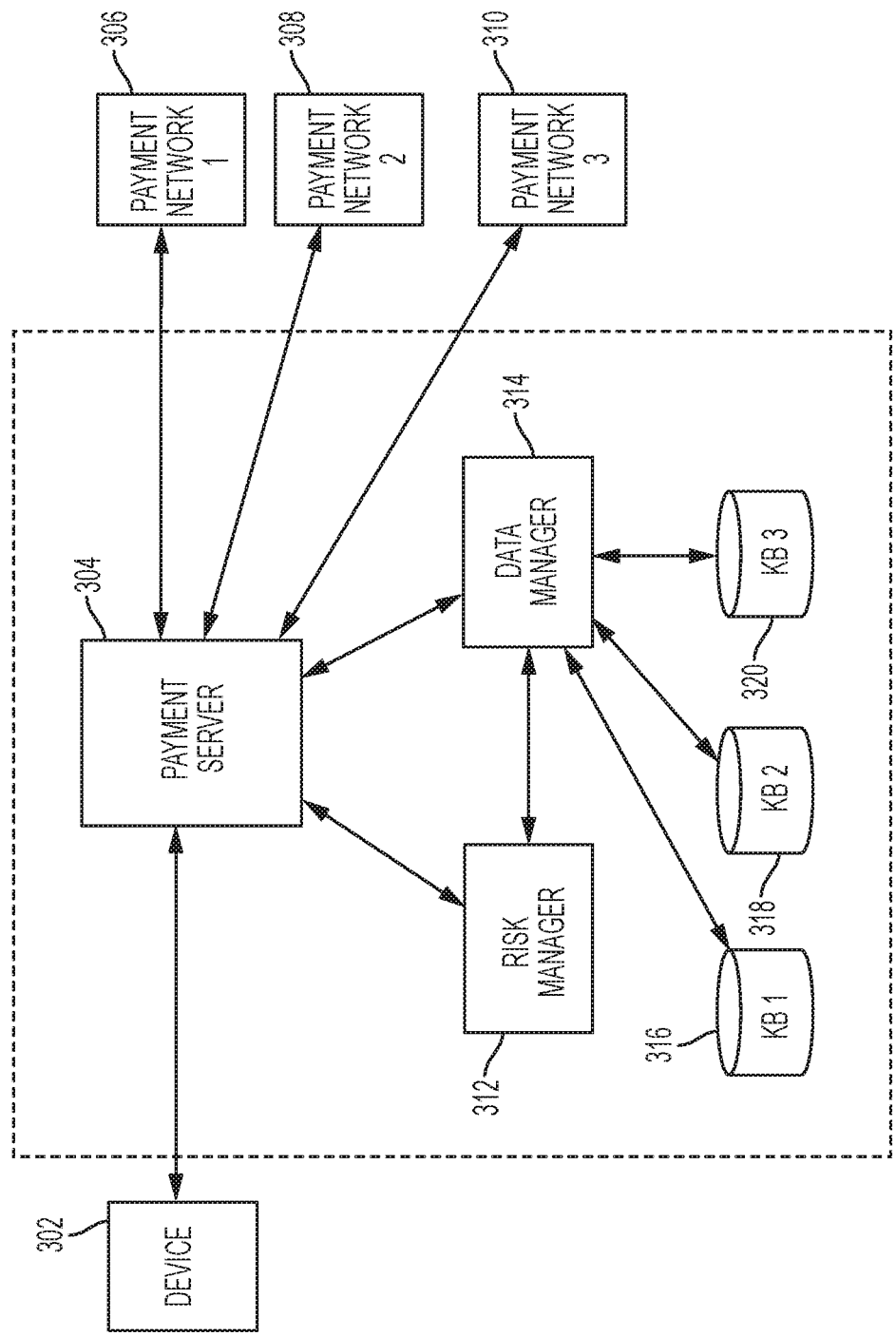
FIG. 3 is a view of a payment system according to an embodiment of the present disclosure.

FIG. 3 is a view of a payment system according to an embodiment of the present disclosure.

Referring to FIG. 3, a payment system is shown according to an embodiment of the present disclosure. The payment system includes devices 302, a payment server 304, and payment networks 306, 308 and 310. Although only one device 302 is shown in FIG. 3, the payment system is provided to serve multiple devices in the manner described below. Further, although only three payment networks are shown in FIG. 3, the payment system is provided to include any number of payment networks.

The device 302 may include the entire configuration of, e.g., the electronic device 201 shown in FIG. 2, or only parts thereof. According to an embodiment of the present disclosure, the device 302 interacts with a user, and sends device and enrollment information to the payment server 304 using any wireless communication, including NFC, MST and the like. Examples of such devices include mobile phones, tablets, smart watches, and the like. The payment server 304 may also include the entire configuration of, e.g., the electronic device 201 shown in FIG. 2, or only parts thereof. According to an embodiment of the present disclosure, the payment server 304 has knowledge and capabilities for obtaining and providing risk scores based on the enrollment information and the stored knowledge. The payment networks 306, 308 and 310 may also include the entire configuration of, e.g., the electronic device 201 shown in FIG. 2, or only parts thereof. According to an embodiment of the present disclosure, the payment networks 306, 308 and 310 receive risk scores from the payment server 304 and further calculate risk potentials based on the payment networks own data and algorithms or models.

When a user engages with a payment app, an on-device client or app of the device 302 records device information (e.g., device type, models, time, location, number of flash events, if the device is rooted, and the like). Flashing a device, such as a cell phone, is associated with reprogramming it to work with a carrier other than its intended provider. Rooting a cell phone allows the user to become a super user of the device and be able to access functions that normal users are not allowed to access.

The on-device client of the device 302 also records user card enrollment and provision information. This information can be associated with a user identification, including at least one of a particular userId, deviceId, and/or walletId (e.g., any desired combination of user information, including userId plus deviceId). This information can also be associated with a particular accountId. The on-device client of the device 302 then sends the user card enrollment and provision information and the device information to the payment server 304. The on-device client of the device 302 can also receive a response or information from the payment server 304 and provide the response to the user.

The payment server 304, or transaction (TR) server, receives the user card enrollment and provision information and the device information from the device 302. The payment server 304 sends the user card enrollment and provision information and the device information to a risk manager 312, and sends user card enrollment and provision information, device information, and any other information that is to be persisted, to a data manager 314. The risk manager 312 and data manager 314 can be hardware, software, or combinations thereof, and can be implemented as part of the payment server 304 or implemented separately.

The data manager 314 persists the user card enrollment and provision information and the device information to a corresponding payment network knowledge base 316, 318 and/or 320. The data manager 314 also provides the risk manager 312 with activity information, device account information, user information and/or other information from the payment network knowledge base 316, 318 and/or 320. Although only three payment network knowledge bases are shown in FIG. 3, the payment system is provided to include any number of payment network knowledge bases. The payment network knowledge bases can be hardware, software, or combinations thereof, and can be implemented as part of the payment server 304 or implemented separately. Further, as described in greater detail below, each of the payment network knowledge bases can be dedicated to one or more of the individual payment networks 306, 308 and 310.

The risk manager 312 can generate a risk score associated with a particular userId, deviceId, walletId and/or accountId based on the user card enrollment and provision information and the device information from the payment server 304, and the activity information, device account information, user information and/or other information from the payment network knowledge bases 316, 318 and/or 320. The payment server 304 can then receive the risk score from risk manager 312. According to an embodiment of the present disclosure, the risk manager 312 can implement a mathematical model to compute the risk score.

A mathematical model is used by the risk manager 312 to combine the sets of features (e.g., user, device, account, and so forth) into a value that reflects an identifiable risk score. A specific mathematical model can be used for each set of features (i.e., userId, deviceId, walletId and/or accountId). For example, a "userId" mathematical model can be used to take all user information and generate a userId risk score. In this case, the final risk score can be specified as a weighted combination of the specific risk score(s). According to another embodiment of the present disclosure, the risk manager 312 can implement a mathematical model that can be used to cover all sets of features.

Any number of suitable mathematical models as known to those skilled in the art can be used, including those automatically learned using machine-learning methods such as logistic regression or support vector machines (SVM). As one example, the risk score can be a probability value associated with fraud, given the sets of features. Such a probability value, in this case, can be obtained from a probability calculator or statistically analyzing history data or other data.

The payment server 304 can then send user card enrollment, provision information and/or risk scores to one or more of the payment networks 306, 308 and 310. The payment networks 306, 308 and 310 can receive the information and/or risk scores from the payment server 304, and further calculate risk potentials based on the payment networks own data and algorithms or models. The payment networks 306, 308 and 310 can then decide a response to a requested action by the device 302, and send the response to the payment server 304. Once the response is received from one or more of the payment networks 306, 308 and 310, the payment server 304 can persist the response to one or more corresponding or dedicated payment network knowledge bases 316, 318 and 320 using the data manager 314, and send the response back to the on-device client of the device 302.

By taking advantage of the unique position in the complete mobile pay ecosystem, the payment server 304 is able to obtain and provide risk values based on information aggregated across multiple payment networks. Specifically, the data manager 314 can aggregate the user common information, user account information, user activity information and device information associated with a particular userId, deviceId, walletId and/or accountId that are retrieved from individual payment frameworks across all payment frameworks. In doing so, risk of one account can be used in assessment of another account. Further, cumulative risks of all accounts, no matter how minor, can be used in assessment of an account. Still further, manipulation of devices (e.g., root devices, factory resets, and the like), can be used in assessment of an account, because the system and method determines risk based on information aggregated across networks.

According to an embodiment of the present disclosure, each payment network 306, 308 and 310 can further calculate their own risk scores, while the risk manager 312 calculates a risk score as well. The risk scores from the different payment networks 306, 308 and 310 can then become one of the factors in the risk score calculated by the risk manager 312, and vice versa.

The risk manager 312 can receive the user card enrollment, provision information and the device information from the payment server 304, and can receive the information aggregated across networks such as user common information, user account information, user activity information and device information for the particular userId, accountId, walletId, and deviceId from the data manager 314. The risk manager 312 can then combine the user current enrollment information with one or more of the retrieved user common information, user account information, user activity information, and device information to determine a risk score indicating if a card provision can be approved, send the risk score to one or more payment networks via the payment server 304, and update one or more knowledge bases with new information via the data manger 314.

As noted above, the risk manager 312 can implement a mathematical model to compute the risk score. Risk score calculations performed by the risk manager 312 can include any number of suitable risk determination models that consider factors, including encoded credit card information, hashed PII, and data associated with the PII, such as accounts associated with the user, account, device, age of accounts, wallet accounts, accounts on device, number of transactions or registration activities (e.g., within a time window), number of successful or failed registration attempts, or number of factory reset activities of the device. The risk score calculations may also consider how closely the encoding or hash of user common information between the device input and aggregated information matches or is in agreement. The contribution of each factor to the final risk score is not necessary equal. Contribution ratios of each factor can be predetermined, set or revised based on experience or using a machine learning model. The risk manager 312 can then send the risk score to the payment server 304 to be sent to one or more of the individual payment networks 306, 308 and 310.

The data manager 314 can receive the user card enrollment, provision information and the device information from the payment server 304, and manage operations (e.g., read, write, update, batch process, and so forth) of each of the payment network knowledge bases 316, 318 and 320. The data manager 314 can also send user common information, user account information, user activity information and device information to the risk manager 312.

The payment network knowledge bases 316, 318 and 320 can be used to store the user common information, user account information, user activity information and device information associated with each payment network. The aggregation of such information can be computed at a query time or using offline processes. Examples of such aggregations includes normal database aggregates like count, sum, min, max, data mining algorithms, machine learning algorithms, and/or data processing that can be implemented using batch process and/or map-reduce functions. The payment network knowledge bases 316, 318 and 320 can be queried and return user common information, user account information, user activity information and device information to the data manager module 314.

Each of the payment network knowledge bases 316, 318 and 320 can be dedicated to one or more of the individual payment networks 306, 308 and 310. For example, the payment network knowledge base 316 can be dedicated to the individual payment network 306. The payment network knowledge base 318 can be dedicated to the individual payment network 308. The payment network knowledge base 318 can be dedicated to the individual payment network 308. The payment network knowledge base 316 can also be dedicated to the individual payment networks 306 and 308. These are just examples, and embodiments are not limited thereto.

The individual payment networks 306, 308 and 310 can receive user card enrollment, provision information and/or risk scores from the payment server 304. The individual payment networks 306, 308 and 310 can further calculate risk potentials based on user card enrollment, provision information, and/or risk scores from the payment server 304 and other payment network specific information using its own algorithms or models, and determine whether to allow a user card provision requested by the device 302. If the individual payment networks 306, 308 and 310 allow the user card provision requested by the device 302, the individual payment networks can send provision related information to the payment server 304, and the payment server 304 can persist the response to one or more corresponding or dedicated payment network knowledge bases 316, 318 and 320 using the data manager module 314, and send the response back to the on-device client of the device 302.

Figure 4:
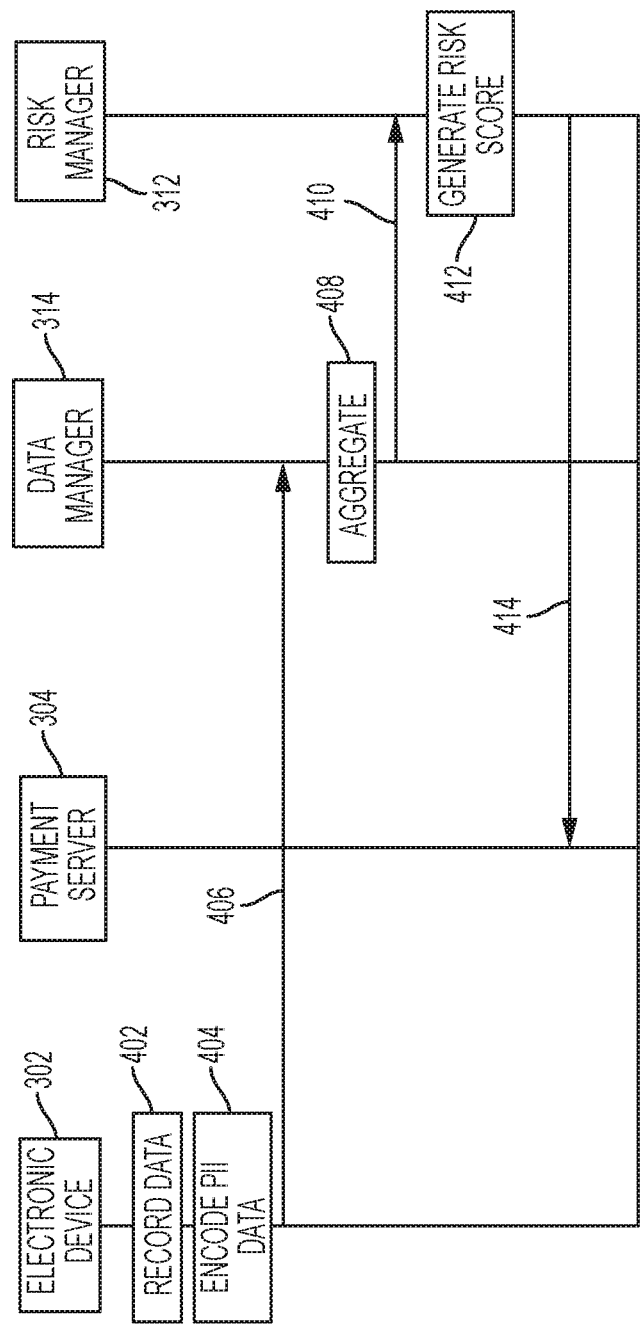
FIG. 4 is a diagram illustrating risk score generation according to an embodiment of the present disclosure.

FIG. 4 is a diagram illustrating risk score generation according to an embodiment of the present disclosure.

As noted above, the system and method stores credit card data and device data at a knowledge base associated with the payment network, where the stored information includes user common information, user account information, user activity information and device information. The credit card data includes encoded credit card information (e.g., credit card numbers, expiration date, etc.), anonymous user information (e.g., hashed PII) and mobile app information, and the device data includes device ID, device type and device activity data. That is, to provide user anonymity, the system and method can be implemented using private information protection. For example, the system and method can be implemented using algorithms to protect private user data (e.g., encoding of credit card numbers, expiration date, etc., hashed PII, and so forth) that prevent attack, even when the payment server is compromised. However, the system and method remains able to calculate risk scores using the encoded information.

Referring to FIG. 4, when a user engages with a payment app, an on-device client or app of the device 302 records device information (e.g., device type, models, time, location, and the like) at operation 402. The on-device client of the device 302 also records user card enrollment and provision information. This information is associated with any desired user information, for example, a particular userId, deviceId, and/or walletId (e.g., any desired combination of user information, including userId plus deviceId). This information can also be associated with a particular accountId.

To provide user anonymity, the system and method can be implemented using encoding and hashing to protect private user data (e.g., encoding of credit card numbers, expiration date, etc., hashed PII, and so forth) that prevent attack, even when the payment server is compromised. To do so, each device 302 may have a different device specific salt, and the salt for each device is not known by the payment server. The PII data is hashed by the device specific salt and results in a one way salted hash at operation 404.

The on-device client of the device 302 then sends the hashed PII to the data manager 314 via the payment server 304 at operation 406. According to an embodiment of the present disclosure, only PII is hashed. Aggregation can then be based on the number of unique hashed values at operation 408. With salted and hashed data that cannot be decrypted, the system and method determines if hashes match, the degree to which hashes match, and the extent to which hashes match. If hashes do not match, then only the number of matches or the number of unique hashes can be shown, unless such information is transmitted in a way so the hashes are identified as data such as card numbers, expiration dates, etc., and like data is compared to like data. Additional details of the hashing and aggregation of data is shown in FIG. 6.

Figure 6:
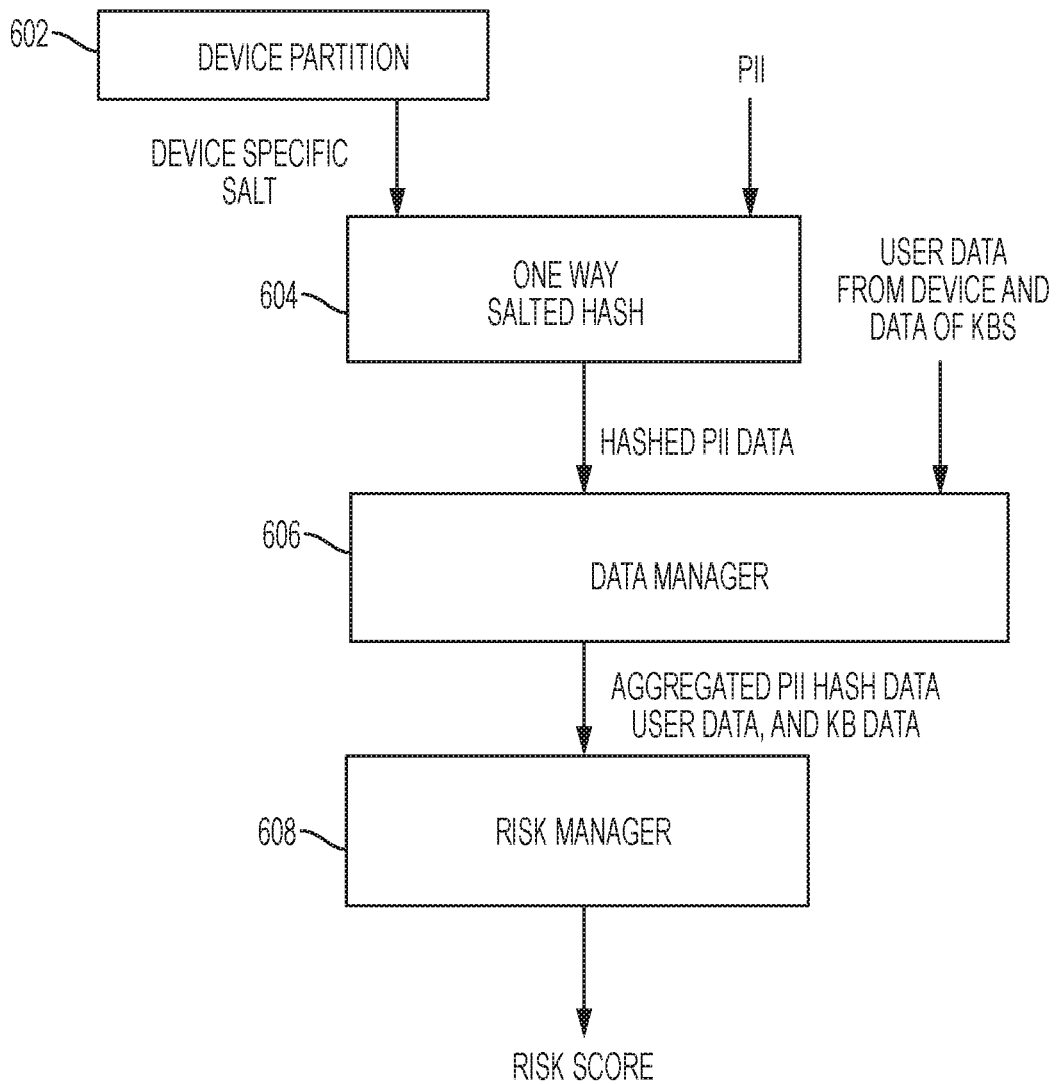
FIG. 6 is a flowchart of a method of hashing and aggregating data according to an embodiment of the present disclosure.

FIG. 6 is a flowchart of a method of hashing and aggregating data according to an embodiment of the present disclosure.

At operation 602, a user device (e.g., the device 302 of FIG. 4) provides a device specific salt for hashing PII and hashes the PII at operation 604. The resulting hashed PII is provided to the data manager (e.g., the data manager 314 of FIG. 4) at operation 606, with non-hashed credit card information from the device. Data of the dedicated payment network knowledge bases (e.g., the knowledge bases 316, 318 and 320) associated with the device is also provided to the data manager at operation 606.

The data manger then aggregates the hashed PII with non-hashed credit card information from the device, and with data of the dedicated payment network knowledge bases associated with the device, and provides the aggregated data to the risk manager (e.g., the risk manager 312 of FIG. 4). The risk manager can then generate a risk score at operation 608.

Returning to FIG. 4, the data manager 314 persists the hashed PII to a corresponding payment network knowledge base 316, 318 and/or 320. Each of the payment network knowledge bases 316, 318 and 320 can be dedicated to one or more of the individual payment networks 306, 308 and 310.

The aggregated hashed PII and other data retrieved from a corresponding payment network knowledge base 316, 318 and/or 320 can then be sent to the risk manager 312 at operation 410. The risk manager 312 can generate a risk score associated with a user identification at operation 412. The risk score can be based on the user card enrollment and provision information and the device information from the payment server 304, and the activity information, device account information, user information and/or other information (including the hashed personally identifiable information data) from the payment network knowledge bases 316, 318 and/or 320. The payment server 304 can then receive the risk score from risk manager 312 at operation 414.

Figure 5:
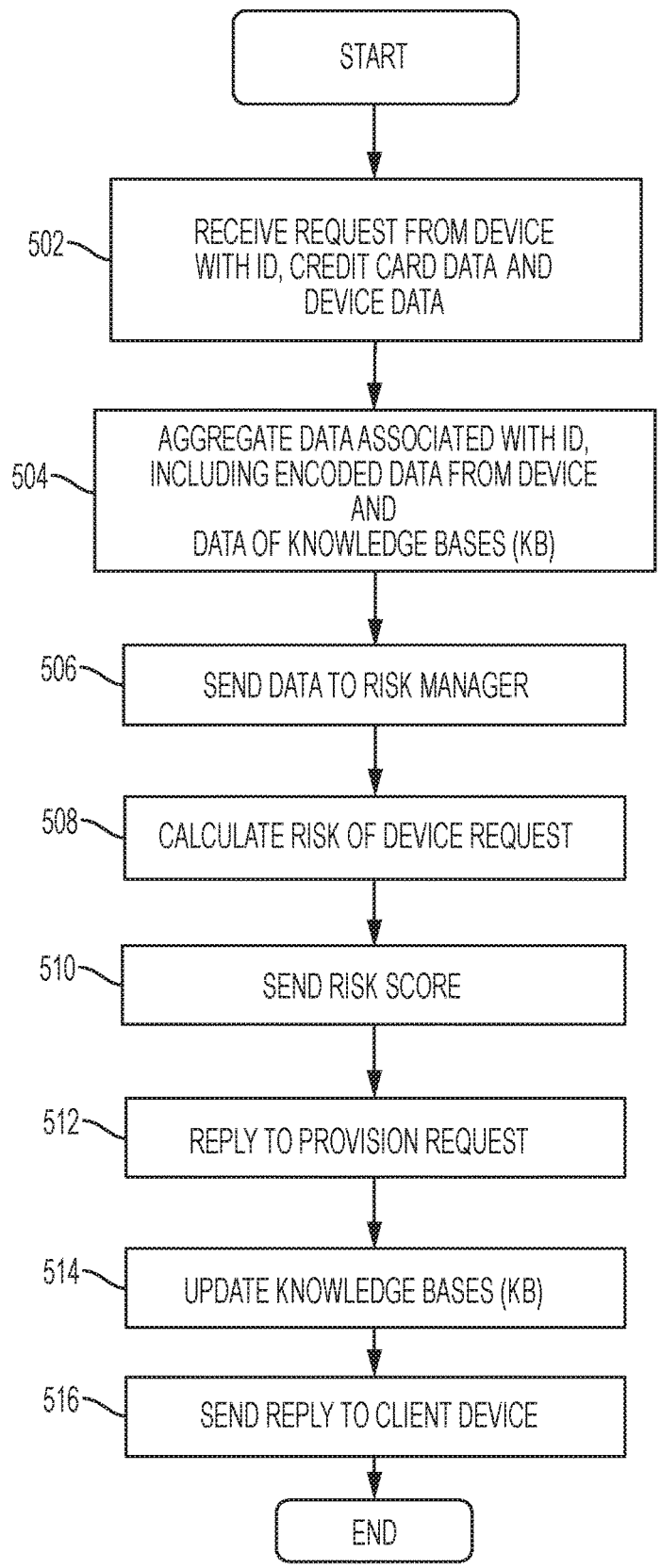
FIG. 5 is a flowchart of a method of risk score generation according to an embodiment of the present disclosure.

FIG. 5 is a flowchart of a method of risk score generation according to an embodiment of the present disclosure.

At operation 502, the payment server 304 receives a request from the device 302, the request including payment or credit card data and device data associated with a particular userId, deviceId, walletId and/or accountId. Each device 302 has a different device specific salt, and the salt for each device is not known by the payment server. Any PII is encoded by the device specific salt and results in a one-way salted hash.

At operation 504, the data manager 314 generates aggregated data by retrieving stored information associated with the particular userId, deviceId, walletId and/or accountId from one or more knowledge bases, each knowledge base being associated with a payment network supporting a particular type of credit card. When the user tries to enroll a new card in a payment network, or complete a transaction in a payment network, the data manger 314 retrieves one or combination of the following information associated with a particular userId, deviceId, walletId and/or accountId from all knowledge bases, (a) user common information (e.g., location, name, zip, phone, and the like), where the information is encoded/hashed if it is user personal information, (b) user account information (e.g., number of active cards, age of account, and the like), (c) user activity information (e.g., day since last activity, number of transactions, number of enrollment attempts, and the like), and (d) device information (e.g., number of register devices for user, age of account on device, country on device, and the like).

The aggregated data is sent to the risk manager 312 at operation 506. The data manager 314 may also persist or store the credit card data and the device data at a knowledge base associated with the payment network, where the persisted (or stored) information includes user common information, user account information, user activity information and device information in a combination of hashed and non-hashed form associated with a particular userId, deviceId, walletId and/or accountId. According to an embodiment of the present disclosure, only personally identifiable information data is encoded by the device specific salt. For example, the credit card data may include encoded credit card information, anonymous user information and mobile app information, and the device data may include device ID, device type and device activity data.

At operation 508, the risk manager 312 computes a risk score associated with a user identification, including at least one of a particular userId, deviceId, walletId and/or accountId based on the request and the aggregated data. The risk manager 312 can generate a risk score based on the user card enrollment and provision information and the device information from the payment server 304. Additionally, the activity information, device account information, user information and/or other information (including the hashed personally identifiable information data) from the payment network knowledge bases 316, 318 and/or 320 via the data manager 314 may be used in the risk score generation. In accordance with an aspect of the present disclosure, the risk manager 312 can combine user current enrollment information with one or more of the retrieved user common information, user account information, user activity information, and device information to determine a risk score indicating if a card provision can be approved, send the risk score to one or more payment networks, and update one or more knowledge bases with new information. Optionally, the risk manager 312 may also compute a risk score based on transactions performed by the device 302, and the aggregated data.

At operation 510, the risk manager 312 sends, via the payment server 304, the risk score to a payment network corresponding to the request for risk determination. The individual payment networks 306, 308 and 310 can further calculate risk potentials based on user card enrollment, provision information, and/or risk scores from the payment server 304 and other payment network specific information using its own algorithms or models, and determine whether to allow a user card provision requested by the device 302.

If the individual payment networks 306, 308 and 310 allow the user card provision requested by the device 302, the individual payment networks can send provision related information to the payment server 304 at operation 512. The payment server 304 can persist the response to one or more corresponding or dedicated payment network knowledge bases 316, 318 and 320 using the data manager module 314 at operation 514. The payment server 304 can send the response back to the on-device client of the device 302 at operation 516.

Accordingly, embodiments of the present disclosure provide improved fraud detection and risk management by aggregating user common information, user account information, user activity information, and device information, from multiple payment networks while maintaining anonymity of user by encoding PII data. Advantages include, but are not limited to, the capability of detecting fraudulent activities by leveraging information across different payment networks, and the capability of detecting fraudulent activities by leveraging mobile device information. The risk assessment is not limited to credit card provision processes, but can be applied to every single credit card transaction.

It will be appreciated that various embodiments of the present disclosure according to the claims and description in the specification can be realized in the form of hardware, software or a combination of hardware and software. Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may also be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing a system or method as claimed in any one of the claims of this specification and a non-transitory machine-readable storage storing such a program.

While the disclosure has been shown and described with reference to various embodiments thereof, it will be understood by those skilled in the art that various changes in form and detail may be made therein without departing from the spirit and scope of the disclosure as defined by the appended claims and their equivalents. Various embodiments of the present disclosure are described as examples only, and are not intended to limit the scope of the present disclosure. Accordingly, the scope of the present disclosure should be understood to include any and all modifications that may be made without departing from the technical spirit of the present disclosure.

What is claimed is:

1. A method for transaction risk reduction, comprising:
receiving at a server, in a mobile payment framework, with at least one processor and a memory storing one or more computer programs configured to be executed by the at least one processor, a request from a device, the request including payment card data and device data;
generating aggregated data based on stored information retrieved from a plurality of knowledge bases for a particular hashed value of personally identifiable information (PII) of the device, the particular hashed value based on a device-specific salt known only to the device and a payment network that issued the device-specific salt, wherein each knowledge base is associated with a payment network supporting a particular type of payment card;
computing a risk score based on the request and the aggregated data, wherein an authorization of the request is based at least in part on the risk score; and
sending the risk score to a payment network corresponding to the request.

2. The method of claim 1, further comprising:
storing the payment card data and the device data in at least one of the plurality of knowledge bases,
wherein the stored information includes user common information, user account information, user activity information and device information.

3. The method of claim 1,
wherein the payment card data includes encoded payment card information, anonymous user information and mobile app information, and
wherein the device data includes device ID, device type and device activity data.

4. The method of claim 1, further comprising:
updating, after computing the risk score based on the request and the aggregated data, the stored information of the plurality of knowledge bases.

5. The method of claim 1,
wherein the device is associated with a user identification, comprising at least one of a particular userId, deviceId, walletId, or accountId, and the stored information of the plurality of knowledge bases is associated with the particular userId, deviceId, walletId, or accountId, and
wherein the generating of the aggregated data is performed by retrieving and aggregating the stored information associated with the particular userId, deviceId, walletId, or accountId from the plurality of knowledge bases.

6. The method of claim 5, further comprising computing the risk score based on a comparison of the payment card data and the aggregated data.

7. The method of claim 1, further comprising:
extracting, when the request comprises a payment card enrollment request from a mobile device, enrollment data of a payment card and the device data of the mobile device from the payment card enrollment request;
retrieving, from the plurality of knowledge bases, the each knowledge base corresponding to the payment network supporting the particular type of payment card, a plurality of records including user common information, user account information, user activity information, and device information;
generating the aggregated data based on the user common information, the user account information, the user activity information and the device information;
computing the risk score based on the enrollment data, the device data and the aggregated data; and
sending the risk score to the payment network corresponding to the payment card enrollment request.

8. The method of claim 7,
wherein the enrollment data includes encoded payment card information, anonymous user information and mobile app information, and
wherein the device data includes device ID, device type, and device activity data.

9. The method of claim 7, further comprising:
storing the enrollment data and the device data at a knowledge base corresponding to the payment network supporting the particular type of payment card.

10. The method of claim 7,
wherein the user common information comprises at least one of a location, a name, a zip, or a phone number associated with the mobile device,
wherein the user account information comprises at least one of a number of active cards, or an age of account associated with the mobile device,
wherein the user activity information comprises at least one of a period since last activity, a number of transactions, or a number of enrollment attempts associated with the mobile device, and
wherein the device information comprises at least one of a number of registered devices for a user, an age of account on the mobile device, or a country associated with the mobile device.

11. The method of claim 1, further comprising:
extracting, when the request comprises a payment card transaction request from a mobile device, transaction data of a payment card and the device data of the mobile device from the payment card transaction request;
retrieving, from the plurality of knowledge bases, the each knowledge base corresponding to the payment network supporting the particular type of payment card, a plurality of records including user common information, user account information, user activity information, and device information;

generating the aggregated data based on the user common information, the user account information, the user activity information and the device information;

computing a risk score based on the transaction data, the device data and the aggregated data; and sending the risk score to a payment network corresponding to the payment card transaction request.

12. The method of claim 11, wherein the transaction data includes encoded payment card information, anonymous user information and mobile app information, and wherein the device data includes device ID, device type, and device activity data.

13. The method of claim 11, further comprising:

storing the transaction data and the device data at a knowledge base corresponding to the payment network supporting the particular type of payment card.

14. The method of claim 11, wherein the user common information comprises at least one of a location, a name, a zip, or a phone number associated with the mobile device, wherein the user account information comprises at least one of a number of active cards, or an age of account associated with the mobile device, wherein the user activity information comprises at least one of a period since last activity, a number of transactions, and a number of enrollment attempts associated with the mobile device, and wherein the device information comprises at least one of a number of registered devices for a user, an age of account on the mobile device, and a country associated with the mobile device.

15. An electronic device in a mobile payment framework to execute instructions for transaction risk reduction, the electronic device comprising:

a transceiver configured to transmit and receive data; and at least one processor configured to:

receive a request from a device, the request including payment card data and device data, generate aggregated data based on stored information retrieved from a plurality of knowledge bases for a particular hashed value of personally identifiable information (PII) of the device, the particular hashed value based on a device-specific salt known only to the device and a payment network that issued the device-specific salt, wherein each knowledge base is associated with a payment network supporting a particular type of payment card, compute a risk score based on the request and the aggregated data, wherein an authorization of the request is based at least in part on the risk score, and send the risk score to a payment network corresponding to the request, for risk determination.

16. The electronic device of claim 15, wherein the at least one processor is further configured to:

store the payment card data and the device data in at least one of the plurality of knowledge bases, wherein the stored information includes user common information, user account information, user activity information and device information.

17. The electronic device of claim 15, wherein the payment card data includes encoded payment card information, anonymous user information and mobile app information, and wherein the device data includes device ID, device type and device activity data.

18. The electronic device of claim 15, wherein the at least one processor is further configured to:

update, after computing the risk score based on the request and the aggregated data, the stored information of the plurality of knowledge bases.

19. The electronic device of claim 15, wherein the device is associated with a user identification, comprising at least one of a particular userId, deviceId, walletId, or accountId, and the stored information of the plurality of knowledge bases is associated with the particular userId, deviceId, walletId, or accountId, and wherein generating of the aggregated data is performed by retrieving and aggregating the stored information associated with the particular userId, deviceId, walletId, or accountId from the plurality of knowledge bases.

20. The electronic device of claim 19, wherein the at least one processor is further configured to compute the risk score based on a comparison of the payment card data and the aggregated data.

21. A non-transitory computer readable storage medium with a computer program stored thereon, the computer program including instructions configured to be executed by at least one processor of a server in a mobile payment framework to perform a method for transaction risk reduction, the method comprising:

receiving a request from a device, the request including payment card data and device data;

generating aggregated data based on stored information retrieved from a plurality of knowledge bases for a particular hashed value of personally identifiable information (PII) of the device, the particular hashed value based on a device-specific salt known only to the device and a payment network that issued the device-specific salt, wherein each knowledge base is associated with a payment network supporting a particular type of payment card;

computing a risk score based on the request and the aggregated data, wherein an authorization of the request is based at least in part on the risk score; and sending the risk score to a payment network corresponding to the request, for risk determination.

22. The non-transitory computer readable storage medium of claim 21, wherein the method further comprises:

storing the payment card data and the device data in at least one of the plurality of knowledge bases, wherein the stored information includes user common information, user account information, user activity information and device information.

23. The non-transitory computer readable storage medium of claim 21, wherein the payment card data includes encoded payment card information, anonymous user information and mobile app information, and wherein the device data includes device ID, device type and device activity data.

24. The non-transitory computer readable storage medium of claim 21, wherein the method further comprises:

updating, after computing the risk score based on the request and the aggregated data, the stored information of the plurality of knowledge bases.

25. The non-transitory computer readable storage medium of claim 21, wherein the device is associated with a user identification, comprising at least one of a particular userId, deviceId, walletId, or accountId, and the stored information of the plurality of knowledge bases is associated with the particular userId, deviceId, walletId, or accountId, and wherein the generating of the aggregated data is performed by retrieving and aggregating the stored information associated with the particular userId, deviceId, walletId, or accountId from the plurality of knowledge bases.

26. The non-transitory computer readable storage medium of claim 25, wherein the method further comprises computing the risk score based on a comparison of the payment card data and the aggregated data.

* * * * *

UNITED STATES PATENT AND TRADEMARK OFFICE
CERTIFICATE OF CORRECTION

PATENT NO. : 10,891,620 B2
APPLICATION NO. : 15/228532
DATED : January 12, 2021
INVENTOR(S) : Meng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this
Fourteenth Day of February, 2023

Katherine Kelly Vidal
*Director of the United States Patent and Trademark Office*